United States Patent
Na et al.

(10) Patent No.: US 7,150,829 B2
(45) Date of Patent: Dec. 19, 2006

(54) WATER TREATMENT CARTRIDGES AND PROCESSES RELATED THERETO

(75) Inventors: Henry Cheng Na, Cincinnati, OH (US); Joseph T. Funk, St. Paul, OH (US)

(73) Assignee: Pur Water Purification Products, Inc., Cincinnati, OH (US)

( * ) Notice: Subject to any disclaimer, the term of this patent is extended or adjusted under 35 U.S.C. 154(b) by 177 days.

(21) Appl. No.: 10/889,874

(22) Filed: Jul. 13, 2004

(65) Prior Publication Data

US 2005/0051494 A1    Mar. 10, 2005

Related U.S. Application Data

(60) Provisional application No. 60/498,548, filed on Aug. 28, 2003.

(51) Int. Cl.
  *B01D 27/02*    (2006.01)
(52) U.S. Cl. .................. 210/266; 210/748; 210/679
(58) Field of Classification Search ................ 210/266, 210/748, 679
  See application file for complete search history.

(56) References Cited

U.S. PATENT DOCUMENTS

| | | | |
|---|---|---|---|
| 1,759,012 A | 5/1930 | Lancaster |
| 2,167,225 A | 7/1939 | Van Eweyk |
| 2,335,458 A | 11/1943 | Senyal |
| 2,605,901 A | 8/1952 | Morrison |
| 3,519,134 A | 7/1970 | Hassinger |
| 3,554,377 A | 1/1971 | Miller |
| 3,872,013 A | 3/1975 | Nishino |
| 3,890,225 A | 6/1975 | Kajiyama |
| 3,956,132 A | 5/1976 | Takemitsu |
| 4,025,438 A | 5/1977 | Gelman |
| 4,094,779 A | 6/1978 | Behrman |
| 4,172,796 A | 10/1979 | Corder |
| 4,325,975 A | 4/1982 | Lindon |
| 4,334,990 A | 6/1982 | Du Manoir de Juaye |
| 4,463,031 A | 7/1984 | Someya |
| 4,493,772 A | 1/1985 | Tanaka |
| 4,678,571 A | 7/1987 | Hosaka |

(Continued)

OTHER PUBLICATIONS

Perry, R. et al., "*Perry's Chemical Engineers' Handbook*", 18-20 (1977).

*Primary Examiner*—Chester T. Barry
(74) *Attorney, Agent, or Firm*—Dinsmore&Shohl LLP

(57) ABSTRACT

An embodiment is directed to a water treatment cartridge for treating drinking water. The water treatment cartridge may comprise a housing, an inlet for introducing water into the water treatment cartridge, an outlet port for egress of water from the water treatment cartridge, and a first treatment material. The first treatment material may have a core region. The water treatment cartridge also may have a second treatment material. The second treatment material may be contained within the core region of the first treatment material, such that the first treatment material and the second treatment material are in direct contact and direct communication. The second treatment material may be a calcium source. The water treatment cartridge also may have a liquid-pervious retainer. The retainer may cap the outlet port and may extend into the second treatment material. Water may enter the water treatment cartridge via the inlet, the water may then radially enter the first treatment material, then radially flow through the first treatment material, then, at least a portion of the water may radially enter the second treatment material, then axially flow through the second treatment material, then egress the water treatment cartridge via the outlet port.

12 Claims, 10 Drawing Sheets

U.S. PATENT DOCUMENTS

| | | |
|---|---|---|
| 4,695,379 A | 9/1987 | Nohren, Jr. |
| 4,761,839 A | 8/1988 | Ganaway |
| 4,764,274 A | 8/1988 | Miller |
| 4,769,144 A | 9/1988 | Nohren, Jr. |
| 4,776,956 A | 10/1988 | Gannaway |
| 4,787,973 A | 11/1988 | Ando |
| 4,789,475 A | 12/1988 | Harte |
| 4,828,698 A * | 5/1989 | Jewell et al. ............... 210/266 |
| 4,863,103 A | 9/1989 | Gannaway |
| 4,933,076 A | 6/1990 | Oshima |
| 4,979,654 A | 12/1990 | Nohren |
| 5,082,568 A * | 1/1992 | Holler ........................ 210/679 |
| 5,096,580 A | 3/1992 | Auchincloss |
| 5,106,501 A * | 4/1992 | Yang et al. ................. 210/266 |
| 5,178,734 A | 1/1993 | Palmer |
| 5,186,830 A | 2/1993 | Rait |
| 5,211,973 A | 5/1993 | Nohren |
| 5,215,659 A | 6/1993 | Ando |
| 5,277,802 A | 1/1994 | Goodwin |
| 5,427,748 A | 6/1995 | Wiedrich |
| 5,468,373 A | 11/1995 | Chou |
| 5,500,131 A | 3/1996 | Metz |
| 5,518,631 A | 5/1996 | Maeda |
| 5,525,214 A | 6/1996 | Hembree |
| 5,525,224 A | 6/1996 | Funahashi |
| 5,527,451 A | 6/1996 | Hembree |
| 5,540,848 A * | 7/1996 | Engelhard ................... 210/748 |
| 5,665,240 A | 9/1997 | Hong |
| 5,679,248 A | 10/1997 | Blaney |
| 5,772,119 A | 6/1998 | Someya |
| 5,837,136 A | 11/1998 | Lee |
| 5,910,233 A | 6/1999 | Berg |
| 5,928,504 A | 7/1999 | Hembre |
| 5,958,228 A | 9/1999 | Tokushima |
| 6,013,180 A | 1/2000 | Wang |
| 6,102,213 A | 8/2000 | Gurol |
| 6,106,725 A | 8/2000 | Hong |
| 6,190,547 B1 | 2/2001 | King |
| 6,221,416 B1 | 4/2001 | Nohren, Jr. |
| 6,241,103 B1 | 6/2001 | Hembree |
| 6,251,172 B1 | 6/2001 | Conrad |
| 6,270,664 B1 | 8/2001 | Tsabari |
| 6,274,041 B1 | 8/2001 | Williamson |
| 6,337,015 B1 | 1/2002 | Poirier |
| 6,372,135 B1 | 4/2002 | Kohlstadt |
| 6,537,453 B1 | 3/2003 | Beard |
| 6,569,329 B1 | 5/2003 | Nohren, Jr. |

* cited by examiner

US 7,150,829 B2

WATER TREATMENT CARTRIDGES AND PROCESSES RELATED THERETO

CROSS REFERENCE TO RELATED APPLICATIONS

This application claims the benefit of priority to U.S. Provisional Application Ser. No. 60/498,548, filed Aug. 28, 2003, which is herein incorporated by reference.

FIELD OF THE INVENTION

The invention is generally related to the art of water treatment cartridges.

BACKGROUND OF THE INVENTION

Water may contain many different kinds of contaminants including, for example, particulates, harmful chemicals, and microbiological organisms, such as bacteria, parasites, protozoa, and viruses. In a variety of circumstances, these contaminants must be removed before the water can be used. Harmful contaminants often need to be removed from water using a first treatment material before it is potable, i.e., fit to consume.

Beyond containing harmful contaminants, both treated and untreated drinking water often has a less than ideal taste. There are several factors which may adversely affect the taste of water, including, but not limited to, pH, hardness/softness, post-filter bacteria growth, alkalinity, mineral content, organic contents, etc. These factors are often affected by the first treatment material used to remove the contaminants in the water.

A second treatment material may be used in conjunction with the first treatment material. The use of a second treatment material often decreases the output of the water treatment cartridge. Use of a second treatment material often equates to a more complicated flow path, an additional dense bed for the water to travel through, the use of a permeable and semi-permeable membranes between the first and second treatment material, the use of retainers for collecting fines and sediment, etc.

SUMMARY OF THE INVENTION

In one embodiment, the invention may be directed to a water treatment cartridge for treating drinking water. The water treatment cartridge may comprise a housing, an inlet for introducing water into the water treatment cartridge, an outlet port for egress of water from the water treatment cartridge, and a first treatment material. The first treatment material may have a core region. The water treatment cartridge may also have a second treatment material. The second treatment material may be contained within the core region of the first treatment material, such that the first treatment material and the second treatment material are in direct communication. Water may enter the water treatment cartridge via the inlet, the water may then radially enter the first treatment material, then radially flow through the first treatment material, then, at least a portion of the water may radially enter the second treatment material, then axially flow through the second treatment material, then may egress the water treatment cartridge via the outlet port.

In another embodiment, the invention may be directed to a process for treating water. The process may comprise the steps of:

a) providing a first treatment material having a core region;
b) providing a second treatment material within the core region of the first treatment material;
c) passing water through the first treatment material, such that the water radially enters and radially flows through the first treatment material; and
d) passing water through the second treatment material, such that at least a portion of the water radially enters and axially flows through the second treatment material.

In yet another embodiment, the invention may be directed to a process for adding a second treatment material to an existing water treatment cartridge. The process may comprise the steps of:

a) providing a water treatment cartridge comprising a housing, an inlet for introducing water into the water treatment cartridge, an outlet port for egress of water from the water treatment cartridge, and a first treatment material, the first treatment material having a core region;
b) providing a second treatment material;
c) providing a liquid-pervious retainer;
d) placing the second treatment material into the core region of the first treatment material through the outlet port; and
e) capping the outlet port with the retainer.

In still another embodiment, the invention may be directed to a water treatment cartridge for treating drinking water. The water treatment cartridge may comprise a housing, an inlet for introducing water into the water treatment cartridge, an outlet port for egress of water from the water treatment cartridge, and a water treatment material and a retainer. The retainer caps the outlet port and may extend into the water treatment material a length at least about 2 mm.

BRIEF DESCRIPTION OF THE DRAWINGS

While the specification concludes with claims particularly pointing out and distinctly claiming the invention, it is believed that the invention will be better understood from the following description taken in conjunction with the accompanying drawings in which:

DETAILED DESCRIPTION OF THE INVENTION

I. Definitions

Figure 1:
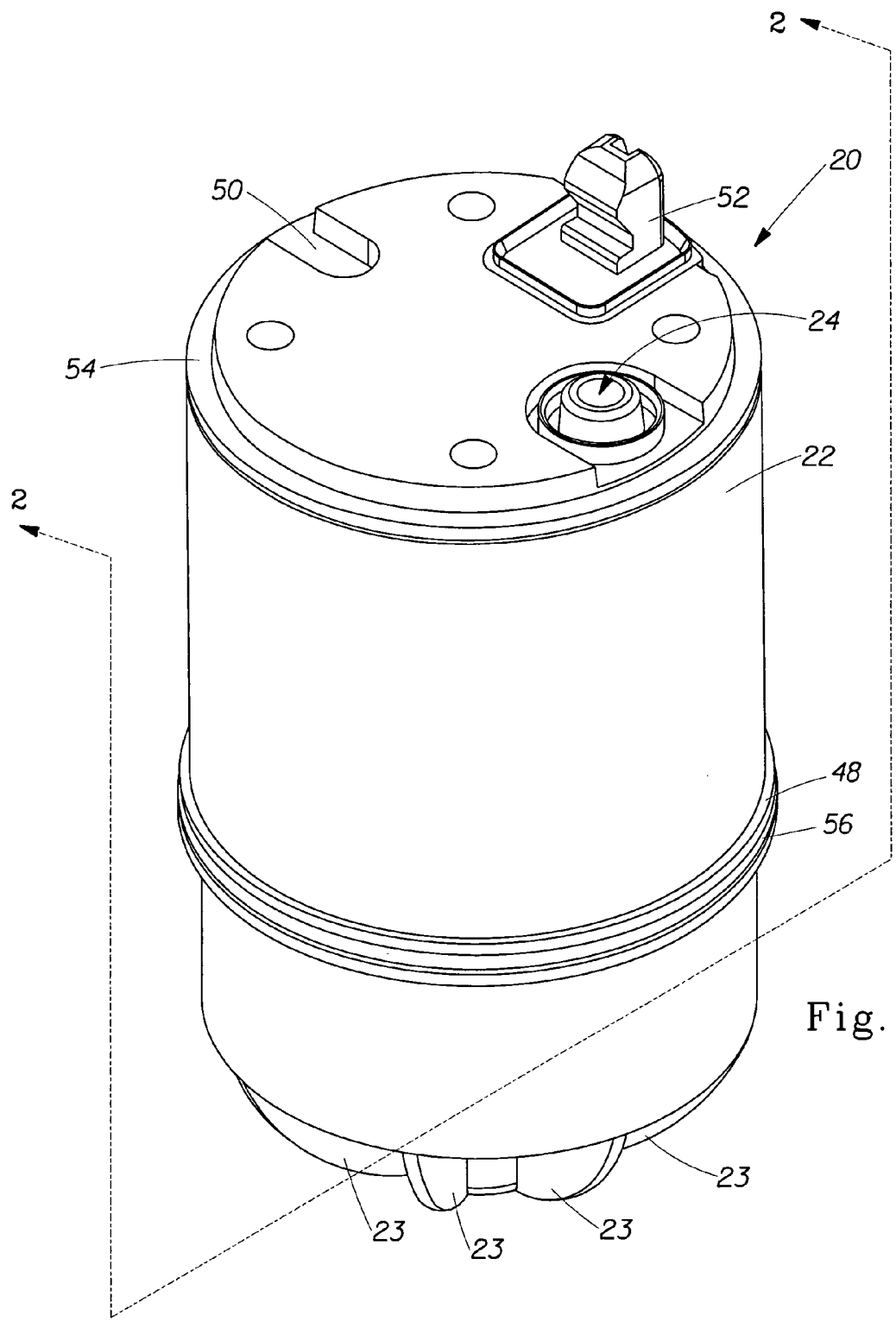
FIG. 1 is a perspective view of a water treatment cartridge made in accordance with the invention.

As used herein, and as described in U.S. patent application Ser. Nos. 10/464,209, and 10/464,210, the phrase "activated carbon particles" and their derivatives are intended to refer to carbon particles that have been subjected to a process in which a carbonized substance is rendered more porous.

As used herein, the phrase "average life flow rate" refers to the average flow rate of the flow rate readings taken over the life of a test of one water treatment cartridge.

As used herein, the phrase "axial entry" or "axially enters" means water entry at any point along the top plane of a water treatment material. The top plane does not include the side portions or bottom portion of the water treatment material.

As used herein, the phrase "axial flow" or "axially flows" refers to water flow which is essentially parallel with the side portions of a water treatment material as the water is treated by the water treatment material. Axial flow of water is normally essentially parallel with the longitudinal axis of a water treatment cartridge.

As used herein, the phrase "combined average life flow rate" refers to the average of the average life flow rates of more than one water treatment cartridge.

As used herein, the term "concentric" means having a common center.

As used herein, the term "coaxial" means a first body being fully within a second body (e.g., a first cylinder being fully within a second cylinder, a first tube completely surrounding a second tube, etc.).

As used herein, the term "contaminants" include microorganisms, viruses, bacteria, pathogens, protozoa, organic matter, inorganic material, suspended solids, parasites, heavy metals, etc.

As used herein, the phrase "coral calcium" refers to fossilized coral harvested either above or below sea level, which includes any of a variety of invertebrate marine organisms of the class Anthozoa (phylum Cnidaria) that are characterized by skeleton, external or internal.

As used herein, the phrase "direct communication" or "directly communicating" means fluid communication between two materials which is uninhibited by a third material.

As used herein, the phrase "direct contact" or "directly contacting" means two materials which physically contact each other such that said contact is uninhibited by a third material.

As used herein, the term "fine" or "fines" means having a particle size smaller than about 100 mesh.

As used herein, the phrase "first treatment material" means a water treatment material which primarily functions to remove or neutralize contaminants by, for example, size exclusion, electrolysis, absorption, adsorption, oxidation, reduction, chemical disinfection, ion exchange, etc. The first treatment material's primary function is to remove or neutralize contaminants. While the first treatment material may improve the taste of water, provide essential elements of a diet via water, or supplement water for the treatment of disease or improvement of health, such is not the first treatment material's primary function.

As used herein, the phrase "flow rate" means a defined volume of water that a water treatment cartridge can deliver over a defined amount of time. Unless otherwise specified, one may assume that the source of water to be treated is at 60 pounds per square inch (herein, "psi"). As used herein, the term "mesh" is a Tyler designation which refers to the number of openings per linear inch counting from the center of any wire to a point exactly 25.4 mm (1 in) distant (Perry, R., et al., *Perry's Chemical Engineers' Handbook*, 19-18, 19-19, 19-20 (1997)), As used herein, the term "particle" is intended to refer to an individual member or piece, including, but not limited to, a fiber, a granule, a bead, etc. Particles can vary in size, from impalpable particles (e.g., a very fine powder) to palpable water treatment particles.

As used herein, the phrase "radial entry" or "radially enters" means water entry at any point along the side portion of a water treatment material.

As used herein, the phrase "radial flow" or "radially flows" refers to water flow which is essentially perpendicular to the side portion of a water treatment material and as the water is treated by the water treatment material. Radial flow of water is normally essentially perpendicular to the longitudinal axis of a water treatment cartridge.

As used herein, the phrase "second treatment material" means a water treatment material which primarily adds flavor, nutrients, minerals, vitamins, etc. to water, adjusts the pH of water, adjusts the redox potential of water, adjusts softness/hardness of water, adjusts cluster size of water, etc. The second treatment material's primary function is to improve the taste of water, to provide essential elements of a diet via water, or to supplement water to treat disease or to improve health, etc. While the second treatment material may remove or neutralize contaminants, such is not the second treatment material's primary function.

As used herein, the term "sediment" means having a particle size between about 30 mesh and about 100 mesh.

As used herein, the term "treat" or "treatment" means improving water for consumption (e.g., removal of contaminants, addition of flavor, alteration/modification to improve taste, etc.). A first treatment material or second treatment material may be used to treat water, or in the treatment of water.

As used herein, the phrase "water treatment material" means a material for treating water. The water treatment material may be a first treatment material or a second treatment material.

Other terms and phrases used herein after are defined in the specification where discussed.

Reference will now be made in detail to embodiments of the invention, examples of which are illustrated in the accompanying drawings. Numerals with the same last two digits represent the same or similar (not necessarily embodiments) elements throughout the figures (e.g., 22, 122, 222, etc.). Water treatment cartridges described herein may be used where residential-scale treated drinking water is desired, including, but not limited to, refrigerators having ice-makers and/or water ports; water stands or coolers; faucet-mounted, counter-top, under-the-sink, and/or whole-house water treatment appliances; coffee makers, etc. Water treatment cartridges of the invention may be on-demand (that is, capable of delivering treated drinking water at greater than about 2 liters per minute (herein, "L/min") when the delivery pressure of the source of water to be treated is at about 60 psi).

The size limitations placed on elements of the water treatment cartridges are for illustration of residential-type use. Different applications of the invention may demand larger or smaller element specifications. Thus, the disclosed numerical limitations may be up-scaled or down-scaled substantially.

II. Water Treatment Cartridge

Figure 2:
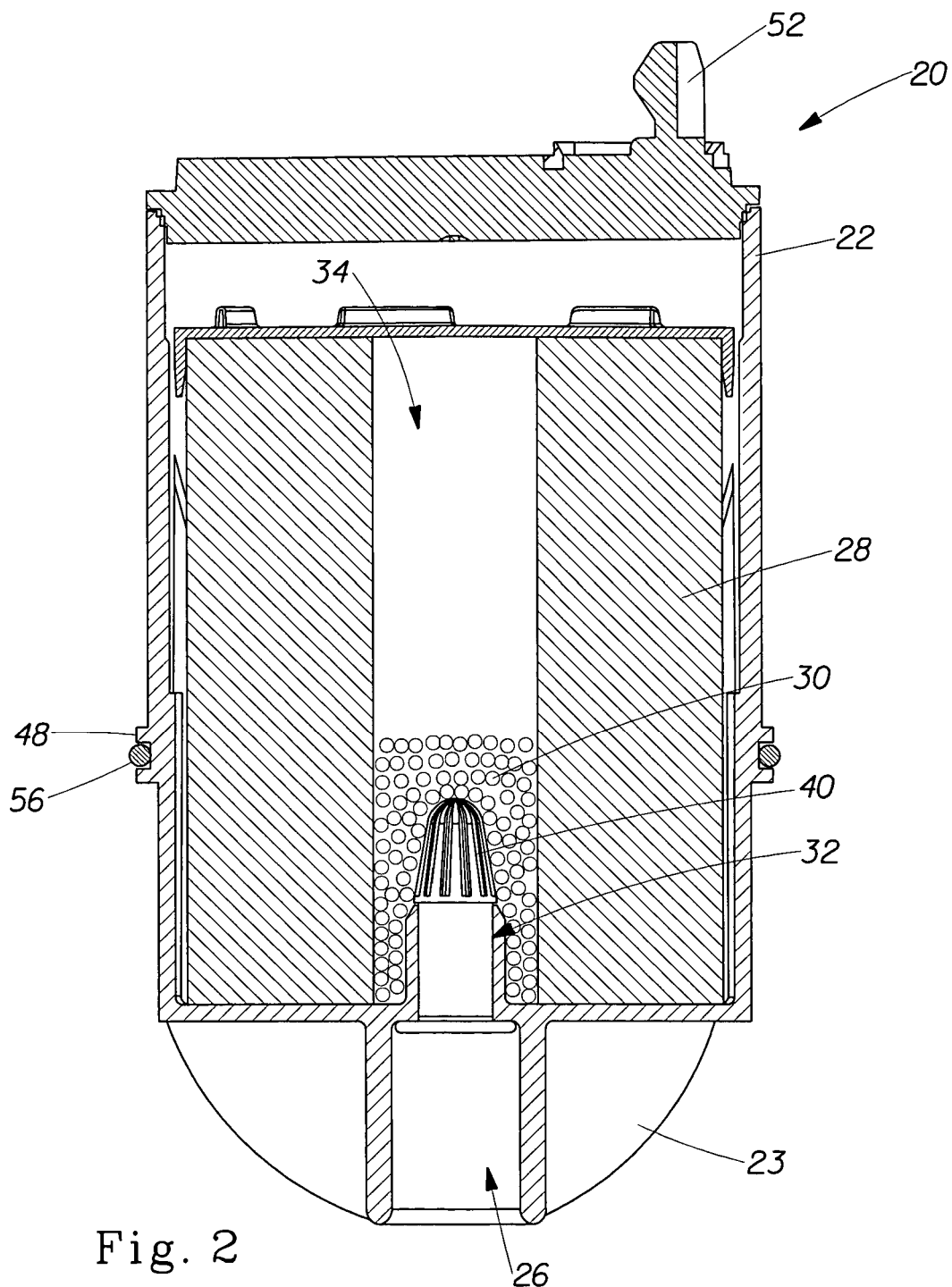
FIG. 2 is a cross-sectional side view of the water treatment cartridge of FIG. 1 taken along the line A—A, wherein the retainer is intact.

As shown in FIGS. 1 and 2, an embodiment of the invention may be a water treatment cartridge 20 which may comprise a housing 22, and an inlet 24, an outlet port 26, a first treatment material 28, and a second treatment material 30, and a liquid-pervious retainer 32. The retainer 32 may be seated within the outlet port 26, such that the retainer 32 retains the second treatment material 30 within the water treatment cartridge 20 and allows egress of treated drinking water from the outlet port 26. The water treatment cartridge 20 may also optionally comprise a channel 48, a notch 50, a cam 52, a shoulder 54, and an o-ring 56 as described in U.S. Pat. Nos. 5,525,214, 5,527,451, 5,928,504, and 6,241,103.

Figure 3:
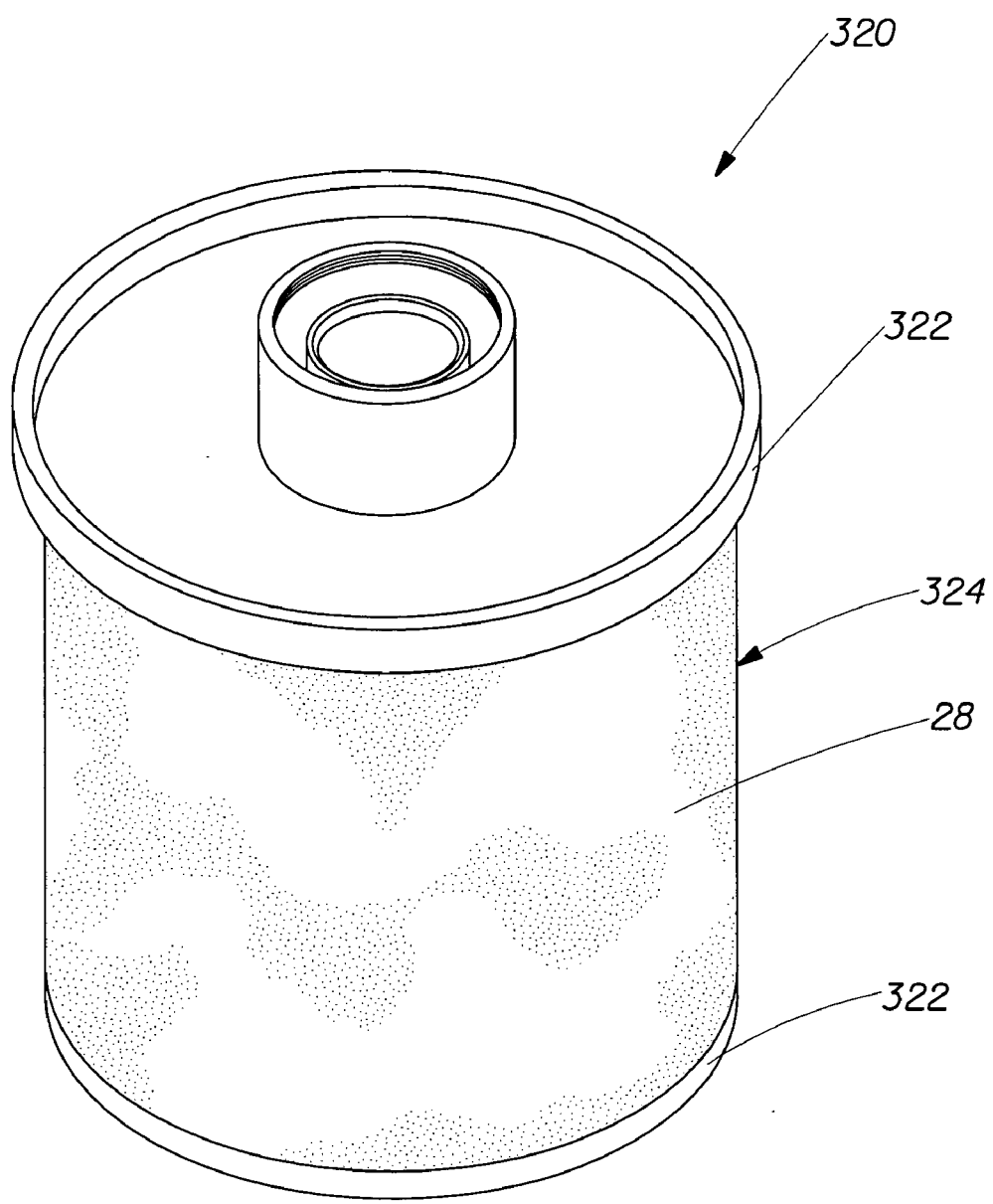
FIG. 3 is a perspective view of an alternate embodiment of the water treatment cartridge of FIG. 1, wherein the first treatment material is exposed and capped by the housing on each end.

The housing 22, as shown in an embodiment of the invention, may be cylindrical, however, it may be various shapes and sizes. The housing 22 may be made from one or more of a variety of materials, including, but not limited to, one or a combination of plastics, metal and alloys thereof, fiberglass, etc. The housing 22 may form a well-defined compartment that holds a treatment material. Alternatively, as shown in FIG. 3, the housing 322 may simply cap the end portions of the first treatment material 28. Additionally, the portion of the housing 22 which forms the outlet port 26 may be supported by one or more ribs 23.

As previously shown in FIG. 1, the inlet 24 may be a circular opening located at the first end of the water treatment cartridge 20. Alternatively, as shown in FIG. 3, the inlet 324 may be a portion of exposed treatment material (e.g., a portion of a carbon block) capped by the housing 322 at both ends. That is, water may enter the water treatment cartridge 320 through the exposed portion of the first treatment material 28. The inlet 24 may optionally be placed on the side or the second end of the water treatment cartridge 20.

Figure 4:
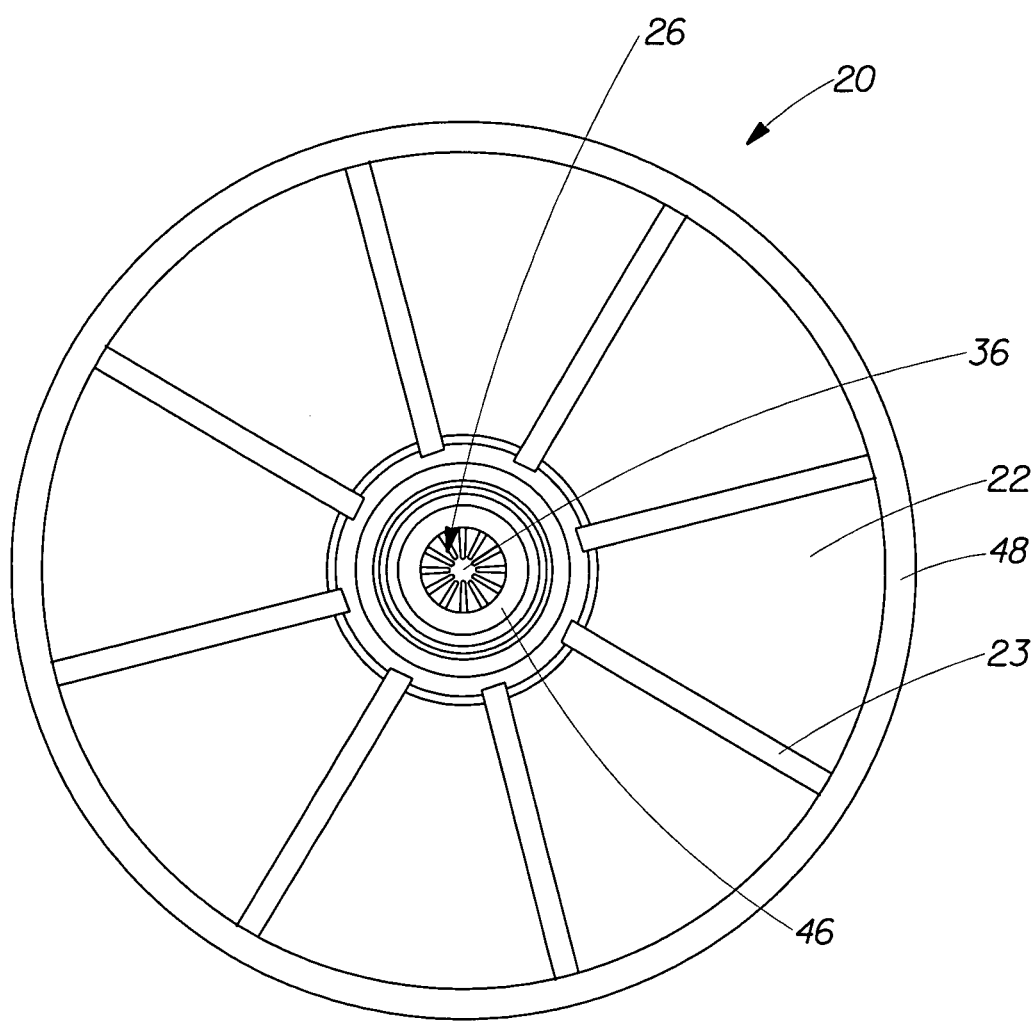
FIG. 4 is a bottom plan view of the water treatment cartridge of FIG. 1.

As shown in FIG. 4, the outlet port 26 may be a circular opening, concentric and coaxial with the longitudinal axis 36 of the water treatment cartridge 20. The inlet 24 and outlet port 26 may be of varying size and oriented in any manner that best serves the application. Thus, the inlet 24 and outlet, port 26 can be oriented in the same proximity (e.g., sharing the same opening), in near proximity (e.g., sharing the same surface or end), or in distant proximities from one another (e.g., located at opposite ends).

The first treatment material 28 may be contained within the housing 22, such that from about 1 gram (herein, "g") to about 200 g, from about 50 g to about 80 g, and/or from about 60 g to about 70 g is contained within the housing 22. The first treatment material 28 may have a bulk density from about 0.1 grams/milliliter (herein, "g/ml") to about 2 g/ml, from about 0.3 g/ml to about 1.8 g/ml, and/or from about 0.4 g/ml to about 1.5 g/ml.

Figure 5:
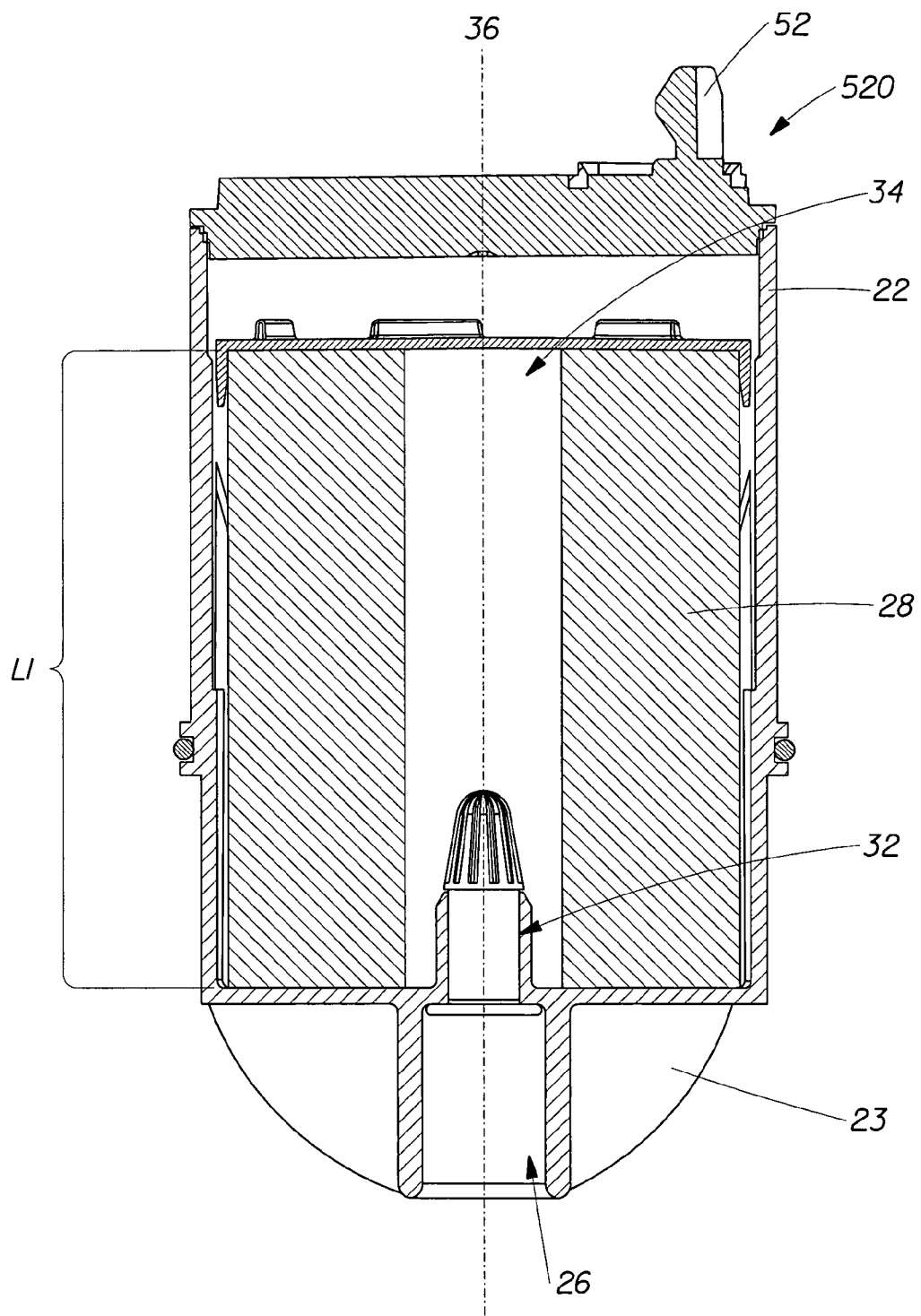
FIG. 5 is a cross-sectional side view of an alternate embodiment of the water treatment cartridge of FIG. 1 taken along the line A—A, wherein the water treatment cartridge is without a second treatment material, wherein the retainer is intact.

As shown in FIG. 5, the first treatment material 28 may have a core region 34. As used herein, "core region" means the hollow formed within a first treatment material 28 capable of containing a second treatment material 30 (See FIGS. 2, 8, 9, and 10). The first treatment material 28 may be in the form of a block having a core region 34. The core region 34 may be concentric and/or coaxial with the longitudinal axis 36 of the water treatment cartridge 520. The core region 34 may extend continuously from the first end, to the second end of the first treatment material 28, or may extend only partially into the first treatment material 28. The core region 34 may have a volume of from about 0.2 ml to about 500 ml, from about 1 ml to about 125 ml, and/or from about 2 ml to about 12 ml. The distance L1 (the length of the core region 34) from the first end of the core region 34 to the second end of the core region 34 may be from about 10 millimeters (herein, "mm") to about 250 mm, from about 25 mm to about 150 mm, and/or from about 40 mm to about 60 mm. The diameter of the core region 34 may be from about 5 mm to about 50 mm, from about 7 mm to about 30 mm, and/or from about 9 mm to about 16 mm.

Examples of the first treatment material 28 are described in U.S. Pat. Nos. 2,167,225, 2,335,458, 4,172,796, 4,493,772, 4,764,274, 4,025,438, 4,094,779, 5,679,248, 6,274,041, 6,337,015, and U.S. patent application Ser. Nos. 10/464,209, 10/464,210, 09/935,810, 09/935,962, 09/628,632, 09/832,581, 09/832,580, 09/736,749, 09/574,456, 09/564,919, and 09/347,223. For example, the first treatment material 28 may include, but is not limited to, one or a combination of carbon (e.g., activated carbon, such as a tube of porous carbon, or a block of porous carbon, or carbon powder or particles sintered with a plastic binder or the like), ion exchange material (e.g., in the form of resin beads, flat filtration membranes, fibrous filtration structures, etc.), zeolite particles or coatings (e.g., silver loaded), polyethylene, or charge-modified melt-blown or micro-fiber glass webs, alumina, diatomaceous earth, etc.

The second treatment material 30 may be contained within the housing 22, such that from about 1 g to about 50 g, from about 5 g to about 30 g, and/or from about 10 g to about 20 g is contained within the housing 22. Further, as previously shown in FIG. 2, the second treatment material 30 may be contained within the core region 34 of the first treatment material 28, such that from about 500 mg to about 40 g, from about 2 g to about 20 g, and/or from about 5 g to about 15 g is contained within the core region 34, such that from about 1% to about 100%, from about 20% to about 80%, and/or from about 40% to about 60% of the core region 34 volume is occupied by the second treatment material 30. The second treatment material 30 may be contained in the core region 34 such that it is in direct communication and/or direct contact with the first treatment material 28, without being intermixed with the first treatment material 28. Placing the second treatment material 30 in direct communication with the first treatment material 28 keeps the flow path of the water simple. That is, water may flow directly from the first treatment material 28 to the second treatment material 30, minimally impacting the flow rate of the water.

The second treatment material 30 may have a particle size from about 2.5 mesh (about 8 mm) to about 200 mesh (about 0.07 mm), from about 4 mesh (about 4.8 mm) to about 100 mesh (about 0.15 mm), from about 7 mesh (about 2.8 mm) to about 35 mesh (about 0.4 mm), and/or from about 9 mesh (about 2 mm) to about 20 mesh (about 0.8 mm). These particle sizes allow water to easily flow through the second treatment material 30, minimally impacting the flow rate of the water. The second treatment material 30 may have a bulk density from about 0.4 g/ml to about 3 g/ml, from about 0.8 g/ml to about 2 g/ml, and/or from about 1 g/ml to about 1.5 g/ml.

Examples of the second treatment material 30 are described in U.S. Pat. Nos. 3,519,134, 3,554,377, 3,872,013, 3,890,225, 3,956,132, 4325975, 4,678,571, 4,695,379, 4,761,839, 4,769,144, 4,787,973, 4,979,654, 5,096,580, 5,178,734, 5,186,830, 5,211,973, 5,215,659, 5,277,802, 5,427,748, 5,468,373, 5,665,240, 5,772,119, 5,837,136, 5,910,233, 5,958,228, 6,013,180, 6,102,213, 6,106,725, 6,190,547, 6,221,416, 6,251,172, 6,270,664, 6,372,135, 6,537,453, and U.S. application Ser. Nos. 09/911,187, 09/843,086, 10/081,862, 10/177,718, 10/371,864, 10/464, 209, and 10/464,210. For example, the second treatment material 30 may include, but is not limited to, one or a combination of flavorants (e.g., lemon/lime), vitamins (e.g., C, E, etc.), minerals (e.g., a source of calcium, magnesium, potassium, zinc, etc.), nutrients (e.g., enzymes, herb extracts, etc.), etc. The second treatment material 30 of this invention may comprise other conventional water treatment materials as described in U.S. Pat. Nos. 2,167,225, 2,335, 458, 4,172,796, 4,493,772, 4,764,274, 4,025,438, 4,094,779, 5,679,248, 6,274,041, 6,337,015, and U.S. patent application Ser. Nos. 09/935,810, 09/935,962, 09/628,632, 09/832, 581, 09/832,580, 09/736,749, 09/574,456, 09/564,919, and 09/347,223.

Figure 6:
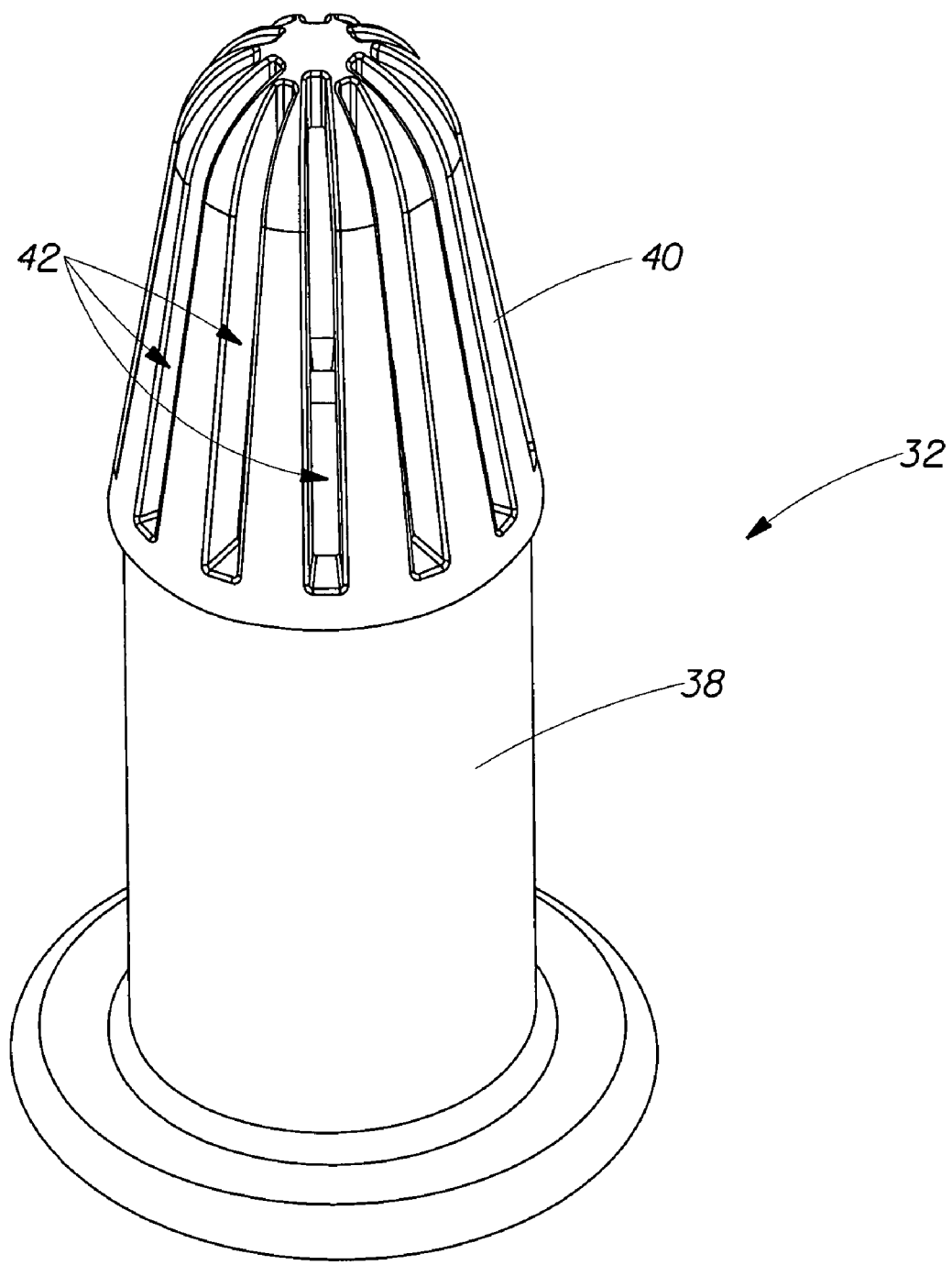
FIG. 6 is a perspective view of the retainer illustrated in FIG. 2.
Figure 7:
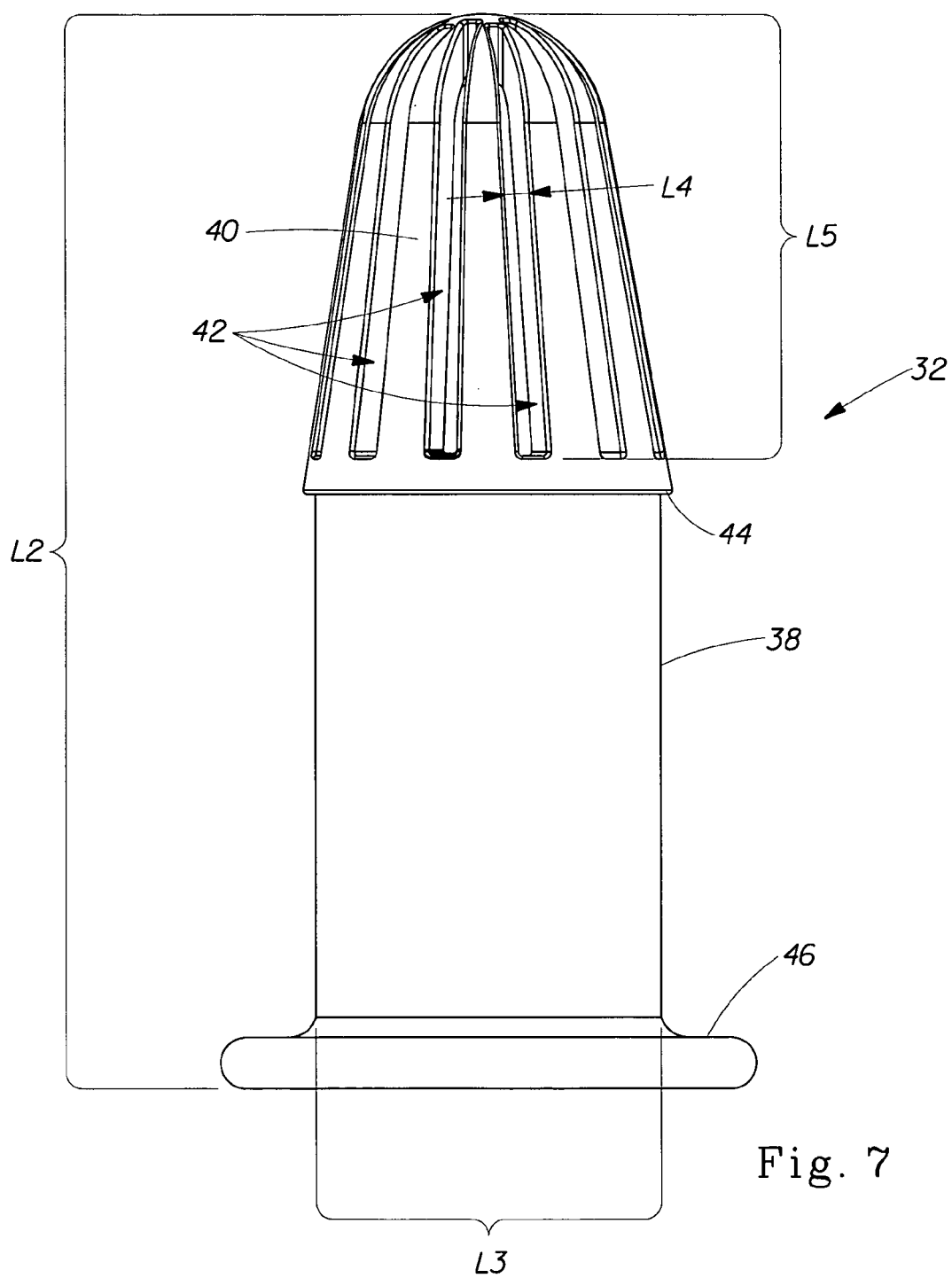
FIG. 7 is a side view of the retainer illustrated in FIG. 2.

As shown in FIGS. 6 and 7, the retainer 32 may have a hollow cylindrical body 38, and a conical end 40; however, the retainer 32 may be one or a combination of various shapes and sizes (including, but not limited to, tubular, square, rectangular, etc.) which are smaller than the second treatment material 30 (that is, which do not allow passage of the second treatment material 30). The end 40 and/or the body 38 may have one or more openings 42. The openings 42 may be various shapes and sizes (e.g., slots, perforations, etc.). The retainer 32 may be made from one or more of a variety of materials, including, but not limited to, one or a combination of plastics, metal and alloys thereof, fiberglass, etc.

The distance L2, the length of the retainer 32, from the first end of the retainer 32 to the second end of the retainer 32 may be from about 2 mm to about 125 mm, from about 5 mm to about 40 mm, and/or from about 9 mm to about 22 mm. The distance L3, the diameter of the body 38 of the retainer 32, may be from about 2 mm to about 50 mm, from about 3 mm to about 30 mm, and/or from about 5 mm to about 12 mm. The distance L4, the width of each opening 42 may be from about 0.01 mm to about 3 mm, from about 0.1 mm to about 2 mm, and/or from about 0.2 mm to about 1 mm. The distance L5, the length of each opening 42 may be from about 0.01 mm to about 50 mm, from about 0.1 mm to about 25 mm, and/or from about 1 mm to about 10 mm. The diameter of an opening may be from about 0.01 mm to about 3 mm, from about 0.1 mm to about 2 mm, and/or from about 0.2 mm to about 1 mm.

The retainer 32 may be permanently connected (e.g., molded, adhesively bonded, soldered, welded, hot plate welded, etc.) or releasably connected (e.g., friction fitted, threadably fitted, bolted, screwed, fastened, snap fitted, latched, etc.) to the housing 22 such that the outlet port 26 is capped by the retainer 32, such that the outlet port 26 is in direct communication with the retainer 32 (that is, the retainer 32 is connected to the portion of the housing 22 which forms the outlet port 26). As shown in FIG. 7, the retainer 32 may have a first lip 44 that may be snapped into place over the housing 22 to ensure that the retainer 32 remains in place and is able to retain the second treatment material 30. The retainer 32 may also have a second lip 46 that is larger than the portion of the housing 22 forming the outlet port 26 and contacts the housing 22 so that the retainer 32 is kept from being over-inserted into the core region 34.

Figure 8:
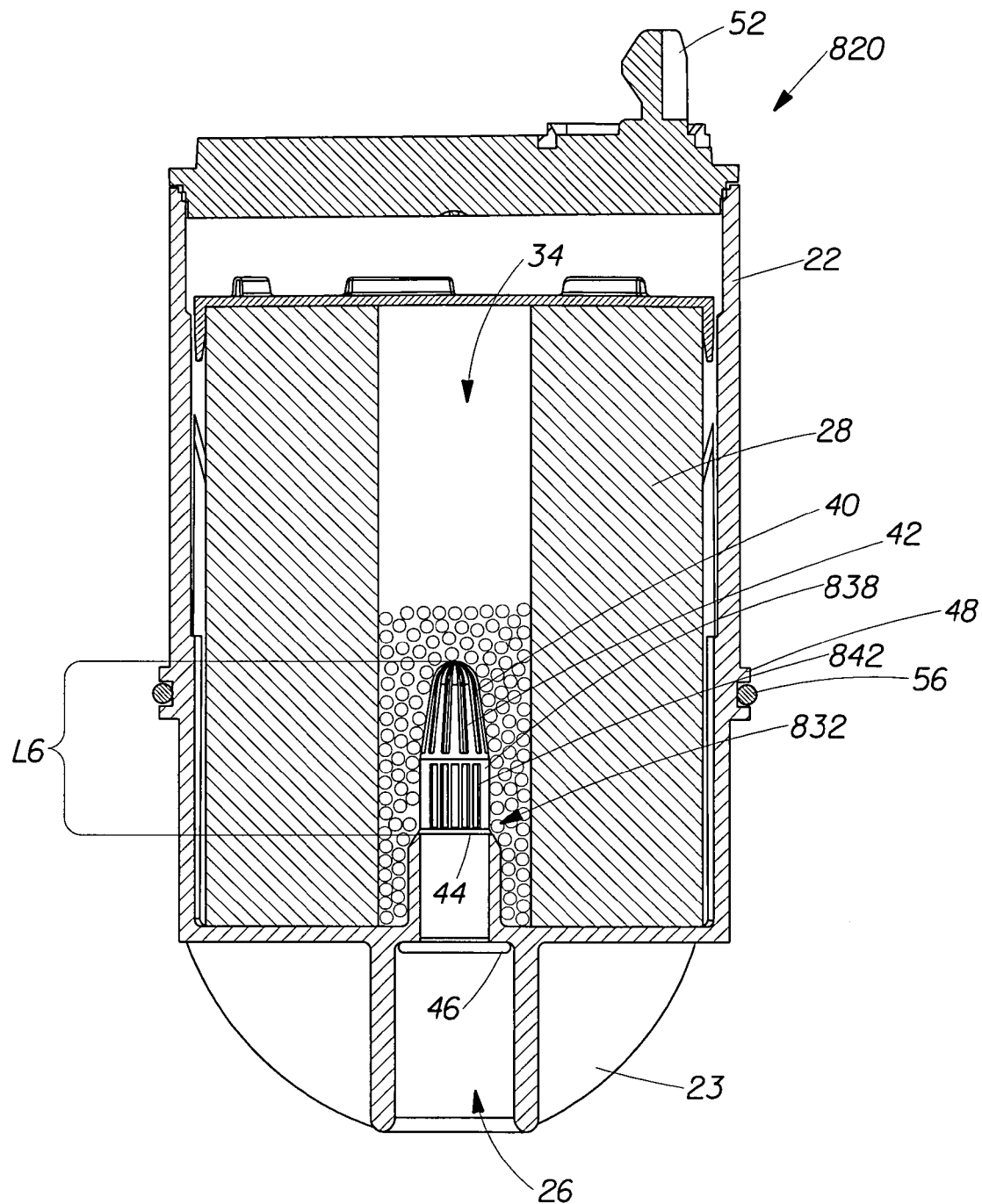
FIG. 8 is a cross-sectional side view of an alternate embodiment of the water treatment cartridge of FIG. 1 taken along line A—A, wherein a retainer is intact and extends into the core region a greater distance than the retainer illustrated in FIG. 2, and has a greater surface area of openings than the retainer illustrated in FIG. 2.

As shown in FIG. 8, the retainer 832 may be extended into the portion of the core region 34 containing the second treatment material 30, such that at least a portion of the retainer 832 is in direct contact with the second treatment material 30. The further that the retainer 832 extends into the portion of the core region 34 containing the second treatment material 30, the greater the surface area of the retainer 832 that is in direct contact with the second treatment material 30. Thus, water flowing through the second treatment material 30 has a greater area to move from the second treatment material 30 into the retainer 832 (provided that the portion of the retainer 832 in contact with the second treatment material 830 has a greater surface area of openings 42 and 842 the further that the retainer 832 extends). Thus the flow rate of water through the water treatment cartridge 820 will be minimally impacted. The distance L6, the length of the retainer 832 in direct contact with the second treatment material 30, may be from about 2 mm to about 125 mm, from about 6 mm to about 40 mm, and/or from about 10 mm to about 17 mm.

Figure 9:
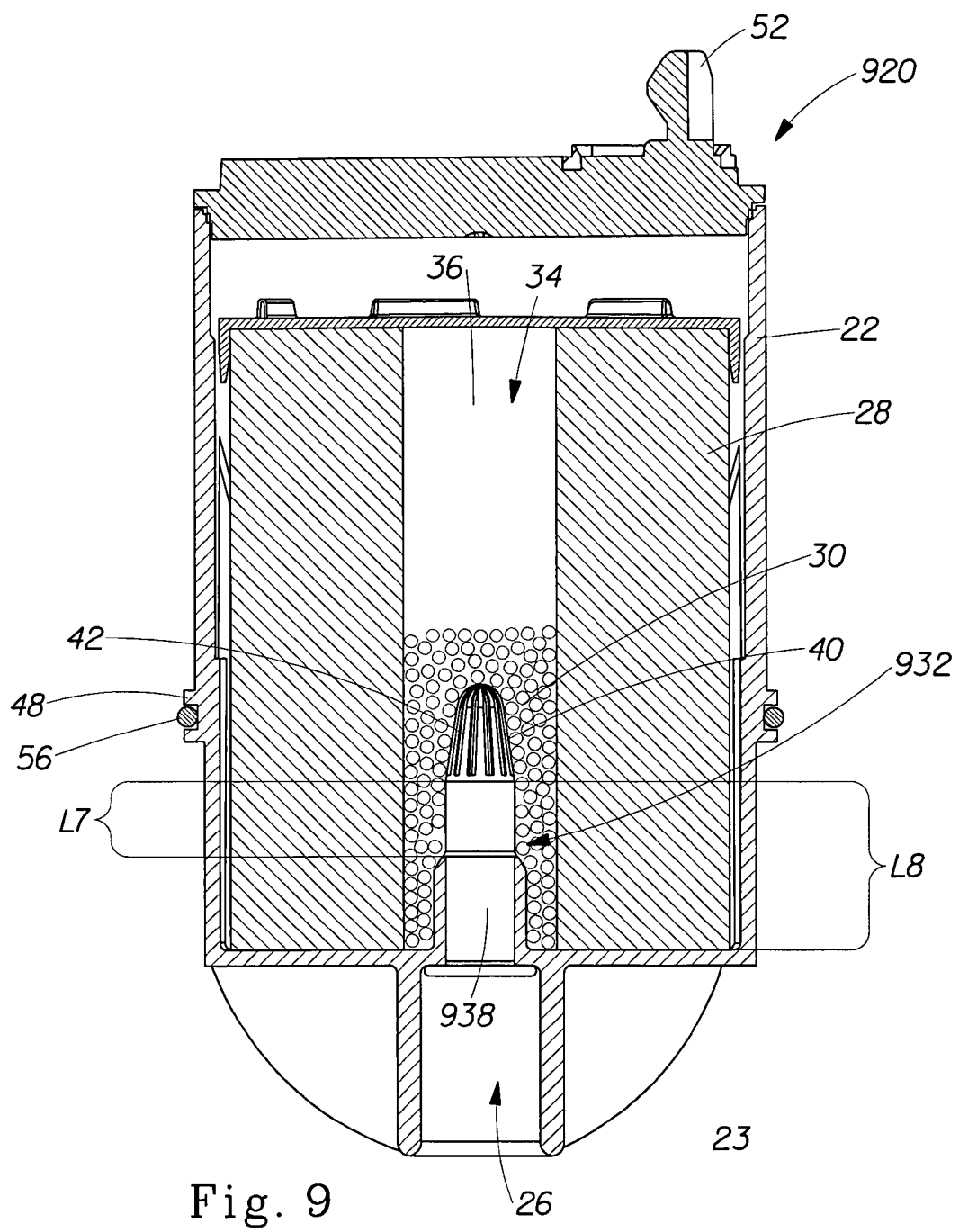
FIG. 9 is a cross-sectional side view of an alternate embodiment of the water treatment cartridge of FIG. 1 taken along line A—A, wherein a retainer is intact and extends into the core region a greater distance than the retainer illustrated in FIG. 2, and its surface area of openings is equal to the retainer illustrated in FIG. 2.

Additionally, as shown in FIG. 9, the further that the retainer 932 extends into the portion of the core region 34 containing the second treatment material 30, the less likely that sediment from the first and second treatment materials 28 and 30 will accumulate between the open portions of the retainer 932 and the second treatment material 30, slowing the flow of water into the retainer 932, and possibly negatively impacting the flow rate of the water treatment cartridge 920. Thus, a retainer 932 may comprise side walls for elevating the portion of the retainer 932 comprising openings 42 further into the core region 34, thus providing a distance (distance L7) between the lowest portion of the retainer 932 in direct contact with the second treatment material 30 and the closest retainer 932 opening 42 (herein referred to as an "elevated retainer orientation", illustrated as distance L7 in FIG. 9 (compare with FIG. 2)) may protect against sediment and/or fines from clogging any portion of the retainer 932 having openings 42. The distance L7, the distance between the lowest portion of the retainer 932 in direct contact with the second treatment material 30 and the closest retainer 932 opening 42, may be from about 0 mm to about 50 mm, from about 5 mm to about 25 mm, and/or from about 10 mm to about 15 mm. Further, the distance L8, the distance between the second end of the core region 34 containing the second treatment material 30 and the closest retainer 932 opening 42, may be from about 0 mm to about 50 mm, from about 2 mm to about 25 mm, and/or from about 5 mm to about 10 mm. An elevated retainer orientation may protect against clogging because sediment or fines would have to fill the core region 34 area from its second end up to the openings 42 of the retainer 932 before any clogging of the openings 42 would occur. For the same reason, an elevated retainer orientation would protect against sediment or fines that are smaller than the openings 42, which had initially passed by the openings 42 of the retainer 932 with the flow of water, because such sediment or fines would not have an opportunity to pass through the retainer 932 until the core region 34 area was filled up to the openings 42 of the retainer 932.

Thus, the retainer 32 may be used, for the purpose of maintaining a flow rate and/or protecting against fines and/or sediment in the treated drinking water, in water treatment cartridges that comprise one or more water treatment materials that produce sediment or fines.

III. Water Flow Through the Water Treatment Cartridge

Figure 10:
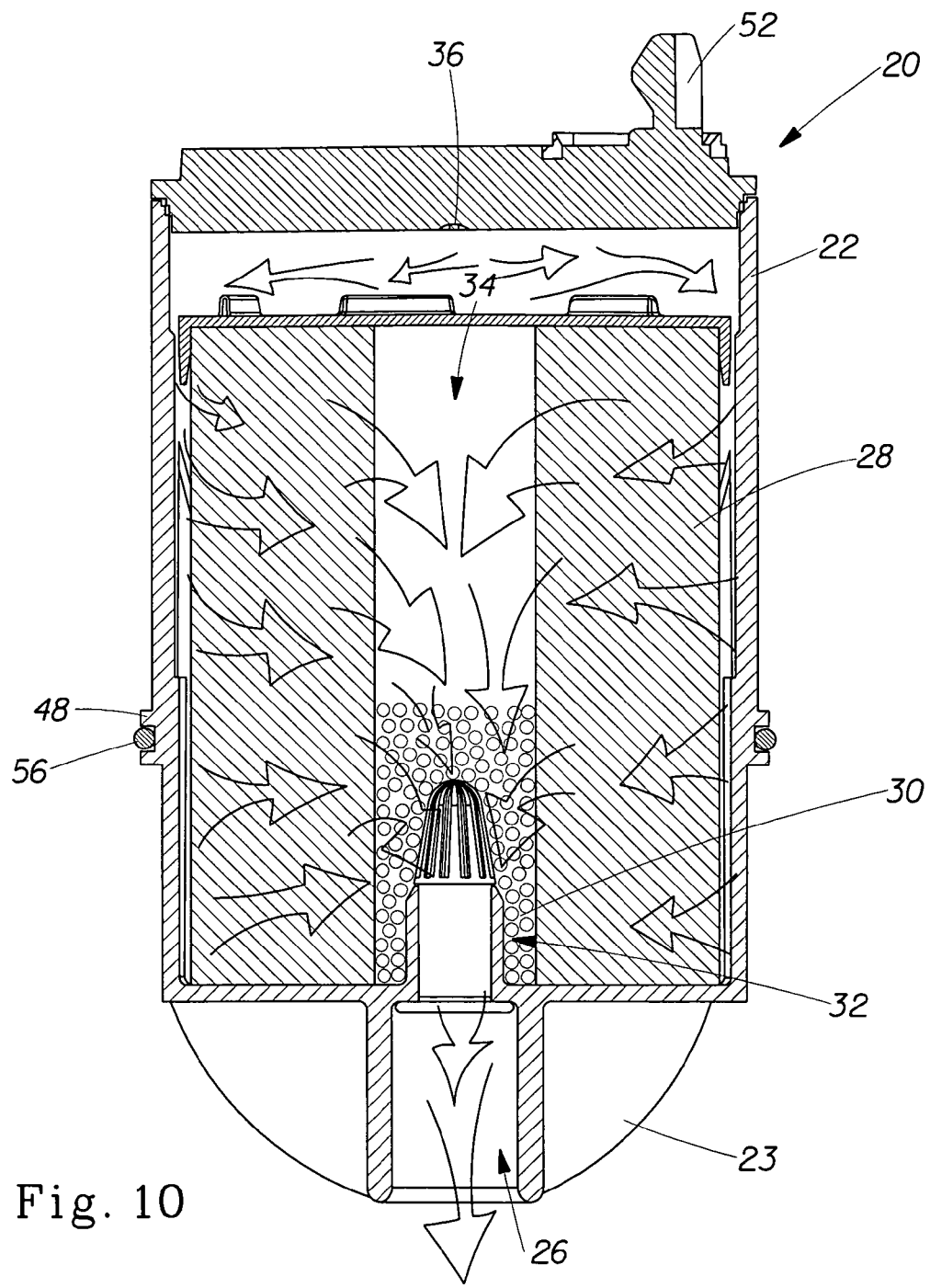
FIG. 10 is a cross-sectional side view of the water treatment cartridge of FIG. 1 taken along the line A—A, wherein the flow of water through the water treatment cartridge is illustrated, wherein the retainer is intact.

As shown in FIG. 10, water may enter the water treatment cartridge 20 via the inlet 24 (not shown). Water may then surround the first treatment material 28, radially entering along the side portion of the first treatment material 28. Water may then radially flow through the first treatment material 28. Upon exiting the first treatment material 28, water axially may enter the top plane of the second treatment material 30 and/or radially enter the side portion of the second treatment material 30, such that there is direct communication between the first and second treatment materials 28 and 30. Water may then axially flow down through the second treatment material 30 from the point that it axially or radially enters. Water may then flow through the openings 42 of the retainer 32 and egresses though the outlet port 26.

The source of water to be treated may be at about 60 psi, and the water treatment cartridge 20 may have an average flow rate from about 1.5 L/min to about 5 L/min, from about 2 L/min to about 4 L/min, and/or from about 2.5 L/min to about 3 L/min.

IV. EXAMPLES

Examples of the invention are described below. These Examples are solely for illustration and the invention(s) described herein is/are not meant to be restricted by these Examples.

Example 1

Water Treatment Cartridge Retaining Coral Calcium

About 10 g of EcoPure Coral, from Coral Inc., 226 E. Enterprise Street, Incline Village, Nev. 89451 USA, having the following particle size distribution information:

Particle Size Distribution (%)

>7 mesh: 0
7–9 mesh: 11.1
9–14 mesh: 80.3
14–20 mesh: 2.4
20–28 mesh: 0.6
<28 mesh: 6.2 is placed into the core region 34 of a PuR Ultimate water treatment cartridge (PuR Ultimate, Model RF-4050, manufactured by PuR Water Purification Products, Inc., 9300 North 75$^{th}$ Avenue, Minneapolis, Minn. 55428) through the outlet port 26. After placing the EcoPure Coral into the core region 34, a retainer 32 (as shown in FIGS. 6 and 7, having an L2 of 30.7 mm, an L3 of 6.68 mm, an L4 of 0.508 mm, and an L5 of 7.75 mm) is glued to the portion of the housing 22 forming the outlet port 26 (as shown in FIG. 2).

Flow rate measurements of five water treatment cartridges (C1–C5) made in conformity with this Example 1 are described in Table 1.

Example 2

Water Treatment Cartridge Containing Coral Calcium

About 10 g of EcoPure FS1020 Coral, from Coral Inc., 226 E. Enterprise Street, Incline Village, Nev. 89451 USA, having the following particle size information:

Particle Size Distribution (%)

>7 mesh: 0
7–9 mesh: 0.1
9–14 mesh: 71.3
14–20 mesh: 28
20–28 mesh: 0.4
<28 mesh: 0.2 is placed into the core region 34 of PuR Ultimate water treatment cartridge (PuR Ultimate, Model RF-4050, manufactured by PuR Water Purification Products, Inc., 9300 North 75$^{th}$ Avenue, Minneapolis, Minn. 55428) through the outlet port 26. After placing the EcoPure FS1020 Coral into the core region 34, a retainer 32 (as shown in FIGS. 6 and 7, having an L2 of 30.7 mm, an L3 of 6.68 mm, an L4 of 0.508 mm, and an L5 of 7.75 mm) is glued to the portion of the housing 22 forming the outlet port 26 (as shown in FIG. 2).

Flow rate measurements of five water treatment cartridges (S16–S20) made in conformity with this Example 2 are described in Table 1.

IV. Test Procedures

A. Flow Rate Test Procedure

Each cartridge tested was inserted into the PuR faucet mount housing (PuR Ultimate, Model FM-4010L, manufactured by PuR Water Purification Products, Inc., 9300 North 75$^{th}$ Avenue, Minneapolis, Minn. 55428). Municipal water was pumped through each cartridge at 60 psi delivery pressure. Flow rate was measured and recorded in real time throughout the life of each cartridge (expressed as total volume of the filtered water).

B. Bulk Density

A 100 ml graduated cylinder was first loose-filled with coral calcium and the weight measured by a balance. The bulk density was calculated by dividing the weight (grams) by 100 (ml).

TABLE 1

| | Flow Rate Measurements Over Time (L/min) | | | | | | | |
|---|---|---|---|---|---|---|---|---|
| Unit | Beginning of Life | 95 L (25 gallons) | 189 L (50 gallons) | 284 L (75 gallons) | 379 L (100 gallons) | 454 L (120 gallons) | Avg. Life Flow Rate | Combined Avg. Life Flow Rate |
| C1 | 2.25 | 2.36 | 2.32 | 2.32 | 2.35 | 2.33 | 2.32 | 2.59 (C1–C5) |
| C2 | 2.62 | 2.62 | 2.65 | 2.64 | 2.64 | 2.65 | 2.64 | |
| C3 | 2.79 | 2.78 | 2.80 | 2.79 | 2.78 | 2.81 | 2.79 | |
| C4 | 2.35 | 2.41 | 2.38 | 2.38 | 2.39 | 2.39 | 2.38 | |
| C5 | 2.79 | 2.77 | 2.78 | 2.79 | 2.83 | 2.81 | 2.79 | |
| S16 | 2.50 | 2.53 | 2.53 | 2.51 | 2.53 | 2.54 | 2.52 | 2.43 (S16–S20) |

TABLE 1-continued

Flow Rate Measurements Over Time (L/min)

| Unit | Beginning of Life | 95 L (25 gallons) | 189 L (50 gallons) | 284 L (75 gallons) | 379 L (100 gallons) | 454 L (120 gallons) | Avg. Life Flow Rate | Combined Avg. Life Flow Rate |
|---|---|---|---|---|---|---|---|---|
| S17 | 2.20 | 2.29 | 2.28 | 2.29 | 2.29 | 2.24 | 2.27 | |
| S18 | 2.39 | 2.43 | 2.45 | 2.42 | 2.42 | 2.43 | 2.42 | |
| S19 | 2.47 | 2.46 | 2.50 | 2.51 | 2.54 | 2.51 | 2.50 | |
| S20 | 2.42 | 2.42 | 2.45 | 2.45 | 2.45 | 2.43 | 2.43 | |

The invention may additionally include information that will communicate to the consumer, by words and/or by pictures, that use of the invention will provide benefits associated with the first and second treatment materials 28 and 30, as well as providing said benefits at a minimum flow rate for a predetermined number of gallons. This information may include a claim of superiority over other water treatment cartridges and products. Accordingly, the use of packages in association with information that will communicate to the consumer, by words and or by pictures, that use of the invention will provide the particular and related benefits as previously mentioned above. The information can include, e.g., advertising in all of the usual material, as well as statements and icons on the package, or the water treatment cartridge 20 itself, to inform the consumer.

All documents cited herein are incorporated by reference. The citation of any document is not to be construed as an admission that it is prior art with respect to the invention.

While particular embodiments of the invention have been illustrated and described, it would be apparent to those skilled in the art that various other changes and modifications can be made without departing from the spirit and scope of the invention. It is therefore intended to cover in the appended claims all such changes and modifications that are within the scope of this invention.

What is claimed is:

1. A water treatment cartridge for treating drinking water, said water treatment cartridge comprising:
   (a) a housing, an inlet for introducing water into said water treatment cartridge, an outlet pod for egress of water from said water treatment cartridge, and a first treatment material, said first treatment material having a hollow core region; and
   (b) a second treatment material;
      wherein said second treatment material is retained within said core region of said first treatment material, by a liquid-pervious retainer, said retainer extending into said core region, such that said first treatment material and said second treatment material are in direct communication, such that water enters said water treatment cartridge via said inlet, the water then radially enters the first treatment material, then radially flows through said first treatment material, then, at least a portion of the water radially enters said second treatment material, then axially flows through said second treatment material, then egresses said water treatment cartridge via said outlet port.

2. The water treatment cartridge of claim 1, wherein said second treatment material has a particle size at least about 200 mesh.

3. The water treatment cartridge of claim 1, wherein said second treatment material has a bulk density from at least about 0.4 g/ml.

4. The water treatment cartridge of claim 1, wherein a length of at least about 2 mm of said retainer is in direct contact with said second treatment material.

5. The water treatment cartridge of claim 1, wherein said first treatment material comprises activated carbon particles.

6. The water treatment cartridge of claim 1, wherein said second treatment material comprises a source of calcium.

7. The water treatment cartridge of claim 1, wherein at least about 20% of the volume of said core region contains said second treatment material.

8. The water treatment cartridge of claim 1, wherein said retainer has an elevated retainer orientation of at least about 5 mm.

9. The water treatment cartridge of claim 1, wherein said water treatment cartridge delivers at least 2 L/min of treated water when the source of water to be treated is at about 60 psi.

10. A water treatment cartridge for treating drinking water, said water treatment cartridge comprising:
    (a) a housing, an inlet for introducing water into said water treatment cartridge, an outlet port for egress of water from said water treatment cartridge, and a first treatment material, said first treatment material having a hollow core region; and
    (b) a second treatment material retained within said core region by a liquid-pervious retainer, said retainer extending into said core region;
       wherein said first and second treatment materials are in direct communication;
       wherein water enters said water treatment cartridge through said inlet, the water then radially enters said first treatment material and radially flows through said first treatment material, then at least a portion of the water radially enters said second treatment material and axially flows through said second treatment material, then egressing the water treatment cartridge through said outlet port.

11. The water treatment cartridge of claim 10, wherein said retainer has an elevated retainer orientation of at least about 5 mm.

12. The water treatment cartridge of claim 10, wherein said water treatment cartridge delivers at least 2 L/min of treated water when the source of water to be treated is at about 60 psi.

* * * * *

UNITED STATES PATENT AND TRADEMARK OFFICE
CERTIFICATE OF CORRECTION

| | |
|---|---|
| PATENT NO. | : 7,150,829 B2 |
| APPLICATION NO. | : 10/889874 |
| DATED | : December 19, 2006 |
| INVENTOR(S) | : Na et al. |

Page 1 of 1

It is certified that error appears in the above-identified patent and that said Letters Patent is hereby corrected as shown below:

Column 11
Line 43, delete "pod" and insert --port--.

Signed and Sealed this

Seventeenth Day of June, 2008

JON W. DUDAS
*Director of the United States Patent and Trademark Office*